Oct. 13, 1959     E. SEGRÈ ET AL     2,908,621
PRODUCING ENERGY AND RADIOACTIVE FISSION PRODUCTS
Filed Dec. 11, 1945     4 Sheets-Sheet 1

Oct. 13, 1959 E. SEGRÈ ET AL 2,908,621
PRODUCING ENERGY AND RADIOACTIVE FISSION PRODUCTS
Filed Dec. 11, 1945 4 Sheets-Sheet 4

2,908,621
Patented Oct. 13, 1959

2,908,621

PRODUCING ENERGY AND RADIOACTIVE FISSION PRODUCTS

Emilio Segrè and Joseph W. Kennedy, Sante Fe, N. Mex., and Glenn T. Seaborg, Chicago, Ill., assignors to the United States of America as represented by the United States Atomic Energy Commission Application December 11, 1945, Serial No. 634,311

2 Claims. (Cl. 204—154.2)

This invention relates to nuclear reactions, including self-sustaining nuclear chain reactions, and more particularly relates to nuclear reaction with the isotope of element 94 having a mass number 239. This element has been named plutonium, symbol Pu, and the isotope is sometimes referred to as $Pu^{239}$ or $94^{239}$.

An object of the invention is to provide a new and valuable process for the production of energy, radioactive fission products, and neutrons.

Another object is to provide masses and compositions that are particularly suitable for use as a source of nuclear power and/or radioactive fission products.

Other objects and advantages of this invention will become apparent as the following detailed description progresses.

In this specification and in the claims the name of the element is used to designate the element generically, either in its free state or combined in a compound, unless otherwise indicated by the sense in which it is used or by a specific designation such as "metal" or "elemental."

The isotope $Pu^{239}$ emits alpha particles with a half life of about $3 \times 10^4$ years. The range of the alpha particles is of the order of 3.6–3.7 cm. in air at atmospheric pressure at a temperature of 15° C.

We have found that $Pu^{239}$ reacts with fast and slow neutrons, including neutrons of thermal energies, producing fission products, energy and fast neutrons. The reaction is typified by the following nuclear equation:

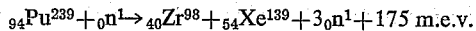

$$_{94}Pu^{239} + _0n^1 \rightarrow {}_{40}Zr^{98} + {}_{54}Xe^{139} + 3{}_0n^1 + 175 \text{ m.e.v.}$$

In the above equation $Zr^{98}$, $Xe^{139}$ and their nuclear disintegration products, such as are produced by beta decay, are fission products. The $Zr^{98}$ and $Xe^{139}$ that are initially produced are also called fission fragments.

Other fission reactions than that shown above also take place with the production of other fission products. The fission products, however, always consist predominantly of two groups of elements, a light group with atomic numbers from about 35 to 44 and a heavy group with atomic numbers from about 51 to 58. Nearly all of the fission fragments undergo beta decay. The fission products obtained from the reaction of $94^{239}$ with slow or fast neutrols are substantially the same as those produced by the fission of $U^{235}$. Among the elements which have isotopes obtained by the fissioning of $94^{239}$ with thermal neutrons and having half lives of more than three days (and thus being present a substantial period of time after the termination of the reaction) are Te, I, Xe, Cs, Ba, La, Ce, Cb, Zr, Sr, Y, and Ru.

The number of neutrons produced in each fission of a $94^{239}$ nucleus varies from considerably greater than 3 to less than 3. The average number of neutrons per fission is approximately 3. These secondary or fission neutrons are fast neutrons having energies of about two million electron volts (2 m.e.v.) and higher.

The reaction of neutrons with $94^{239}$, such as a mass containing $Pu^{239}$ in a concentration of not less than 1 part in 12,000 parts of total mass and preferably not less than 1 part of $Pu^{239}$ in 400 parts of a material, to produce energy and fission products is preferably carried out with slow neutrons having energies of between 0 and 0.3 electron volt. This has several advantages, one of which is the decrease in the amount of nuclear reactions other than the fission reactions, which other reactions are obtained with resonance and fast neutrons. In one embodiment of the invention the $94^{239}$ is bombarded with neutrons, at least 60% and preferably at least 90% being thermal neutrons.

In one embodiment of the invention the reaction of $94^{239}$ with neutrons is carried out with particles or masses of $Pu^{239}$ metal or compounds of $Pu^{239}$ with elements having a low capture cross-section for neutrons such as the oxide, sulfate, carbonate or fluoride, surrounded by or dispersed in neutron slowing material such as paraffin, water, carbon and the like.

Another feature of the invention is the production of energy and fission products by subjecting an enriched element to the action of neutrons. Enriched elements may be made by adding a thermal neutron fissionable isotope to an element containing an isotope that reacts with neutrons to form, either directly or through radioactive decay, a thermal neutron fissionable isotope. For example, natural uranium contains 1 part by weight of the thermal neutron fissionable isotope $U^{235}$ and 139 parts by weight of isotope $U^{238}$ which reacts with neutrons to form $U^{239}$ which undergoes beta decay to form $93^{239}$ (an isotope of neptunium) which decays in turn to the thermal neutron fissionable isotope $94^{239}$. The addition of a thermal neutron fissionable isotope such as $U^{235}$ to natural U produces enriched uranium. We have found that $94^{239}$ is a thermal neutron fissionable isotope having a fission cross section for thermal neutrons even greater than that of $U^{235}$. It also produces more neutrons per fission. The subjection of enriched uranium to the action of neutrons gives a greater yield of fission products and energy per unit quantity hour of neutron input than can be obtained with natural uranium, and further the use of uranium enriched to 5 percent or more with $94^{239}$ or $U^{235}$ makes possible a chain reaction in water solutions that is not possible with natural uranium. Of particular value and readily and economically made is enriched uranium obtained by partially removing the uranium from neutron irradiated uranium containing $94^{239}$. In this manner compositions can be obtained containing $U^{238}$, $U^{235}$ and $94^{239}$. The separation may be carried out so that the $94^{239}$ is present in predominant amount compared to the $U^{235}$, the total ratio of thermal neutron fissional isotope to $U^{238}$ being greater than that present in natural uranium. In this manner the increased efficiency of $94^{239}$ over $U^{235}$ is economically obtained.

The following example illustrates the fission reaction of $Pu^{239}$ with thermal neutrons.

*Example*

A sample of uranyl nitrate $(UO_2(NO_3)_2 \cdot 6H_2O)$ weighing 1.2 kilograms was distributed in a large paraffin block, placed directly behind the beryllium target of a 60-inch cyclotron, and given over a period of about two days a 3500 microampere-hour bombardment with neutrons from beryllium plus 16 m.e.v. deuterons. This uranyl nitrate was placed in a continuously operating glass extraction apparatus, two liters of diethyl ether was added, and practically all of the uranyl nitrate was extracted into the ether phase. The $93^{239}$ was isolated from the aqueous phase with rare earth fluoride carrier by a modification of the method of McMillan and Abelson described in 57 Physical Review, page 1185, the procedure being modified by a preliminary ether extraction of the neutron irradiated uranium to concentrate the $93^{239}$ in aqueous phase and reduce the concentration of uranium, and then carrying out oxidation-reduction fluoride precipitation cycles, oxidizing the 93$^{239}$ with bromate and reducing with SO$_2$. A mixture of 3 mg. of La and 3 mg. of Ce which was "carrying" the 93$^{239}$ was reprecipitated as fluoride six times in order to reduce to a minimum any uranium impurity. This sample of 93$^{239}$ at the time of its purification (which because of the bromate oxidation step included purification from Pu) had an activity of 125 millicuries as determined with the aid of an ionization chamber, connected to a vacuum tube electrometer, which had been calibrated in an absolute manner for 93$^{239}$ radiation by the use of a Geiger counter and the method of aliquots. After the 93$^{239}$ had decayed into 94$^{239}$, preliminary fission tests were made on this sample which then contained 0.5 microgram of 94$^{239}$. This sample was placed near the screen window of an ionization chamber which was imbedded in paraffin near the beryllium target of a 37-inch cyclotron. This gave a fission rate of 4 per minute when a 6 microampere beam of deuterons was used.

This sample, which had a thickness of total material amounting to 4.8 mg. per cm.$^2$, was then subjected to a chemical procedure designed to concentrate the 94$^{239}$ in much less other material. The procedure is described in detail in the copending application of Seaborg, S.N. 637,485, filed December 27, 1945 and consisted briefly of redissolving the sample containing .5 microgram of 94$^{239}$, 3 mg. of La and 3 mg. of Ce in nitric and sulfuric acid, fuming to drive off SO$_3$ and destroy fluoride ions, diluting with water, adding K$_2$S$_2$O$_8$ plus Ag(NO$_3$) to oxidize the Pu to its fluoride soluble state (PuO$_2^{++}$) and then adding HF to precipitate the lanthanum and cerium without precipitating the Pu. After centrifuging, the solution containing the Pu was treated with SO$_2$ to reduce the PuO$_2^{++}$ to its fluoride insoluble state (Pu$^{+4}$ and Pu$^{+3}$) and co-precipitated from solution with .2 mg. of Ce$^{+3}$ by adding HF. The procedure was carefully tested in blank experiments with the aid of element 94 from deuteron activated uranium as tracer to show that the yield was practically 100 percent. In this manner the 0.5 microgram of 94$^{239}$ was isolated with 0.2 mg. cerous fluoride in which the thickness of total material amounted to 0.16 mg. per cm.$^2$. (In a blank experiment in which the same amount of rare earth fluoride was isolated from non-irradiated uranium by an identical chemical procedure the alpha-count was less than ¼ per minute. Correcting for the geometrical factor, as determined with the aid of a known amount of uranium of the same thickness, this means that the sample contained less than 3 micrograms of U$^{238}$ impurity and hence less than 0.03 microgram of U$^{235}$ impurity.) A standard uranium sample, in the form of hydrous oxide, of a thickness and area very nearly the same as that of the 94$^{239}$ sample, was prepared by the electrolysis of uranium out of absolute ethyl alcohol solution. This uranium standard contained 200 micrograms of U$^{238}$ and hence 1.46 micrograms of U$^{235}$. The 0.5 microgram 94$^{239}$ sample, when placed near the screen window of an ionization chamber imbedded in paraffin near the beryllium target of the 37-inch cyclotron, gave a fission rate with slow neutrons of 80 per minute with a 9 microampere deuteron beam. When the ionization chamber and sample were completely surrounded with a shield of cadmium and boron carbide (B$_4$C) the fission rate dropped to less than 0.5 percent of this value, i.e., less than 0.4 per minute. The 1.46 microgram U$^{235}$ sample, when placed in an identical position, gave a fission rate with slow neutrons of 140 per minute under identical conditions. With the cadmium and boron carbide shield the fission rate was 7 percent of this value, i.e., 11 per minute. Hence the fission cross section of 94$^{239}$ for slow neutrons is $1.46/0.5 \times 80/140 = 1.7$ times that of U$^{235}$ for slow neutrons.

Another important feature of the invention is the provision of devices, compositions and masses for the production of a self-sustaining nuclear chain reaction.

By a self-sustaining nuclear chain reaction is meant a nuclear reaction in which, for example, a neutron initially striking a Pu$^{239}$ nucleus reacts to produce fission accompanied by the emission of neutrons, enough of which are available, after loss by leakage, etc., for further fission reaction upon Pu$^{239}$ so that the reaction either continues at the same rate (as where one neutron per fission is available for fission of Pu$^{239}$), or builds up in intensity (as where more than one neutron per fission is available).

Elemental Pu$^{239}$, for example, may be made into a compact mass of a given shape such as a sphere or other shape. When the mass of the Pu$^{239}$ is below a certain critical mass the Pu$^{239}$ is relatively stable, i.e., it will undergo fission but will not undergo a self-sustaining chain reaction when such a mass is irradiated with neutrons. Neutrons which, for example, are normally present in the surrounding atmosphere, or present for any other reason, cannot increase in number and continue to react because such neutrons are either absorbed by foreign material before they react with the Pu$^{239}$ or the neutrons which may be produced during fission are either absorbed by foreign material or lost to the surroundings to such an extent that sufficient neutrons are not available to continue or build up the reaction.

However, when the mass of Pu$^{239}$ reaches or exceeds a certain critical value the number of neutrons escaping from the mass or otherwise unavailable for reaction is not sufficient to decrease the neutrons available for reaction to less than one neutron per fission so that the neutrons continue to react with nuclei of Pu$^{239}$ in what is called a self-sustaining nuclear chain reaction. When the number of neutrons available for reaction with further Pu$^{239}$ is greater than one per fission, the number of neutrons produced during the reaction continues to increase and there occurs a type of self-sustaining nuclear chain reaction which is called a divergent chain reaction. In order that these evolved neutrons may be used efficiently for further fission of further Pu$^{239}$ and to minimize loss or leakage of neutrons it is found desirable to disperse the Pu$^{239}$ in a neutron slowing medium capable of slowing the speed of evolved neutrons without excessive absorption such as water, D$_2$O, graphite, paraffin, beryllium, etc., so that the fission neutrons are slowed to thermal energies without too many neutrons being absorbed.

The minimum mass of Pu$^{239}$ within which a self-sustaining nuclear chain reaction will take place is called the critical mass. A self-sustaining nuclear chain reaction of a critical or more than critical mass of Pu$^{239}$ will take place by itself, probably starting by the action of neutrons present in the surrounding atmosphere, or resulting from the presence of small amounts of certain light elements such as berylium or lithium with the alpha-emitting Pu$^{239}$, or due to spontaneous fission.

In general, self-sustaining nuclear chain reactions with Pu$^{239}$ may be brought about by increasing the effective mass of the isotope from a subcritical mass to a critical mass. This increase may be brought about by simply bringing together two or more subcritical masses to produce a combined mass of the critical or more than critical amount, or it may be brought about in other ways, for example, having a mass which is subcritical because it contains a neutron absorber such as cadmium or boron and then making the mass critical by removing the neutron absorber or a portion thereof. The increase of effective mass may also be brought about by having a mass which is subcritical because of too great an escape of neutrons and making the mass critical or more than critical by reflecting neutrons back into the mass by bringing a neutron reflector in close proximity to the mass. For example, the mass comprising Pu$^{239}$ and a neutron moderator (neutron slowing medium) may be enclosed in graphite which reflects the neutrons. Other means of increasing the effective mass will be apparent.

The optimum shape for a self-sustaining chain reacting mass is a sphere. However, other shapes may be used such as cylinders and cubes, but where one dimension is extremely small as in the case of cylinders of small diameter, the critical mass required may be impractically large.

In accordance with a suitable method of carrying out neutron chain reactions, the $Pu^{239}$ is intimately mixed with neutron slowing material, the concentration of $Pu^{239}$ being sufficiently high and the amount sufficiently large so that a chain reaction will take place with a finite mass of $Pu^{239}$, but the concentration being not so high that the chain reaction will occur with excessive rapidity. In general, the minimum concentration of $Pu^{239}$ will be such that on the average only one of the neutrons emitted in the fission process will be absorbed by the $Pu^{239}$, assuming an average of about 3 neutrons per fission.

The minimum concentration of $Pu^{239}$ is such that the probability of capture of slow neutrons by $Pu^{239}$ is slightly greater than the probability of capture of slow neutrons by the slowing down medium or any other nonfissionable material present in the composition.

The maximum concentration of $Pu^{239}$ for slow neutron self-sustaining chain reactions should be such that the neutrons emitted by fission which do not escape are slowed to thermal energies.

In bringing about a slow neutron self-sustaining chain reaction the composition comprising $Pu^{239}$ and neutron slowing material in suitable concentration is increased in mass from a mass in which $Pu^{239}$ is present in a subcritical amount to a mass in which the $Pu^{239}$ is present in critical or above critical amount. This increase in mass may be done in various ways. For example, where the composition is a liquid such as a solution or slurry of $Pu^{239}$ or a compound thereof the mass may be simply increased by flowing liquid into a container until the container holds an amount of liquid which contains a critical or more than critical mass of $Pu^{239}$ and if the reaction tends to occur with excessive rapidity a portion of the solution may be removed to reduce the amount to less than critical mass or to a value more closely approximating critical mass.

The critical mass of $Pu^{239}$, i.e., the minimum amount of $Pu^{239}$ which when present in a body comprising $Pu^{239}$ and slowing down material is just sufficient to attain a self-sustaining slow neutron chain reaction, is such that if we consider the $Pu^{239}$ as being in the form of a sphere the radius of the sphere is of the order of the distance required to slow down fission neutrons from their fast neutron energy to thermal energy, i.e., from average energies of about 2 m.e.v. (velocity of about 10,000 miles per second) to average energies of about 0.03 electron volts (or a velocity of about 1 mile per second).

The critical mass required to establish a self-sustaining chain reaction is dependent upon the nature of the neutron slowing material and also upon the amount of $Pu^{239}$ which is dispersed throughout the neutron slowing material. This will be more clearly understood by reference to the accompanying drawings in which.

Figure 1:
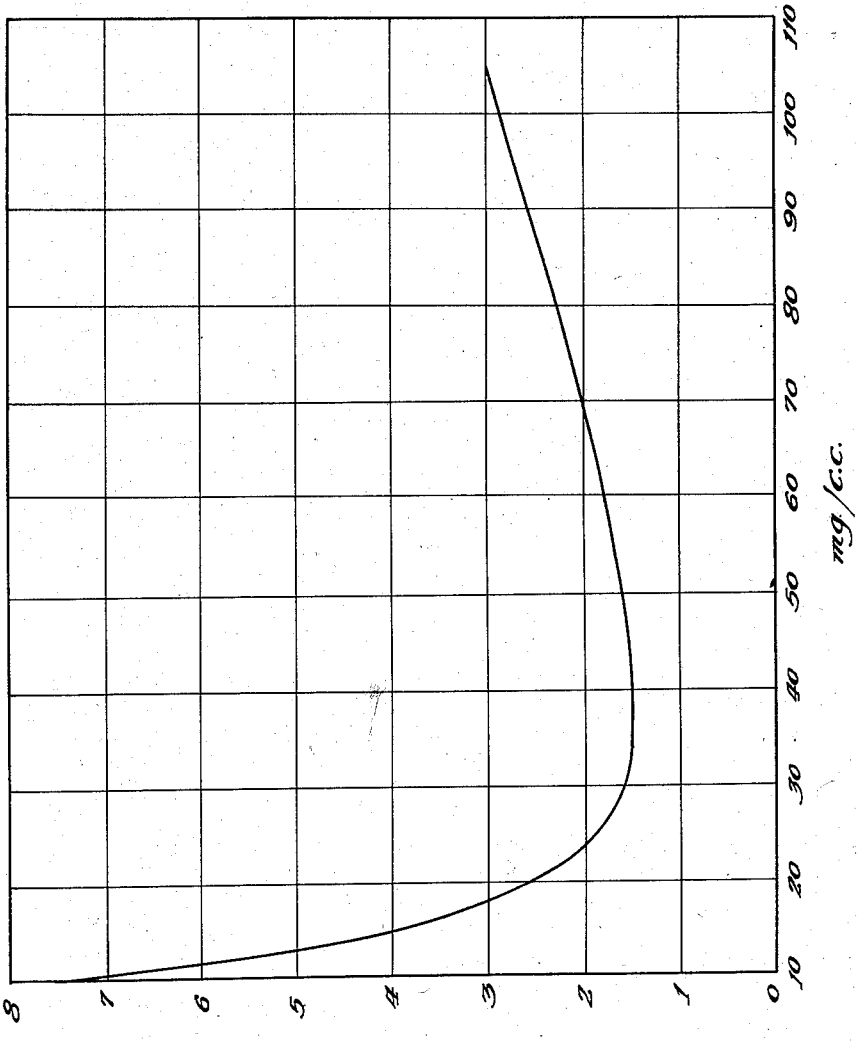
Fig. 1 is a graph illustrating the variation of the critical mass in kilograms of a uniform dispersion of $Pu^{239}$ in water required for a self-sustaining chain reaction with concentration of $Pu^{239}$ in the dispersion in terms of grams per cc.

The values upon which these graphs are based are approximate values which have been determined for a spherical dispersion. Where the moderator is in the form of a cube or parallelopiped or other form somewhat higher values for critical mass may be required.

From a consideration of these graphs it will be apparent that the critical mass of $Pu^{239}$ in the slow neutron chain reaction varies with the concentration of $Pu^{239}$ dispersed in the moderator. It will also be seen that the critical mass is infinity at an extremely low but finite concentration and decreases rapidly with increasing concentration until it reaches a minimum point whereupon the critical mass increases relatively slowly with increasing concentration due to the fact that with more concentrated dispersions more neutrons are lost and their use in creating further fissions is less efficient.

The smallest critical mass of $Pu^{239}$ for a slow neutron chain reaction prevails as a general rule when the $Pu^{239}$ is present intimately dispersed with the slowing down material in such a manner that the probability of capture of thermal neutrons by $Pu^{239}$ is about three times as great as for the slowing down material.

For slow neutron chain reactions with $Pu^{239}$, suitable neutron slowing materials are substances having a neutron capture cross section of less than about $10^{-24}$ square centimeters. Preferably such substances are selected from those having a mass of less than 30 mass units. Such substances include hydrogen, deuterium, helium, fluorine, oxygen, carbon, and beryllium. If desired, these elements may be combined in compounds such as water, heavy water, or paraffin in which the respective atomic nuclei all have a capture cross section of less than about $10^{-24}$ square centimeters.

The slowing down material may be incorporated with $Pu^{239}$ in various ways. The $Pu^{239}$ may be dispersed in the slowing down material, such as a solution of a suitable compound of $Pu^{239}$ in water or heavy water. It may be intimately mixed with the slowing down materials, for example, as small particles of metallic $Pu^{239}$ dispersed in carbon or paraffin. The particles may range in size from atomic or molecular dimension to microscopic size such as spheres of metallic $Pu^{239}$ separated by carbon, hydrogen, water or other suitable neutron slowing down material, but in order to have an efficient system which does not waste $Pu^{239}$, the diameter of the particles of $Pu^{239}$ preferably should be less than about 0.2 mm., and it is preferred that the $Pu^{239}$ be intimately dispersed in the slowing medium.

Slowing down material may also be incorporated with $Pu^{239}$ by employing a compound of $Pu^{239}$ containing one or more of the slowing down substances such as those mentioned above. As examples of such compounds there may be mentioned $Pu^{239}$ carbide and $Pu^{239}$ hydride. However, the ratio of $Pu^{239}$ to slowing down material in such systems is fixed and, therefore, may not be suitable in all cases, particularly where some latitude of control is desired. In such cases the concentration may be further controlled by mixing the given compound with additional slowing down substances to provide the desired overall ratio between $Pu^{239}$ and slowing down material in the composition.

In addition to $Pu^{239}$ and neutron slowing elements of the type mentioned, suitable compositions may also include non-fissionable elements which have only slight neutron slowing action so long as such elements are not present in such amount as to capture neutrons to a greater extent than are captured by the $Pu^{239}$. In the case of certain elements, such as S, Ca, and certain other ones, fairly large amounts may be present without preventing the possibility of a chain reaction; with other elements, such as B, Cd, Li, and certain other ones, only very small amounts may be present because of their relatively large capture cross-section for neutrons.

It is also contemplated that the $Pu^{239}$, preferably with neutron slowing elements, may in addition be mixed with $U^{238}$. The action of slow neutrons on $U^{238}$ produces $U^{239}$ which decays to $93^{239}$ which in turn decays to $94^{239}$, thus supplying $94^{239}$ to aid in the continuance of the chain reaction. Instead of mixing the $Pu^{239}$ with pure $U^{238}$, it may be mixed with uranium which contains a large proportion of $U^{238}$ and a small proportion of $U^{235}$. Preferably, intimate mixtures of $Pu^{239}$ and uranium are made, the $U^{235}$ being present with the uranium in at least the proportion in which it is present in natural uranium. Amounts of $Pu^{239}$ of above about 0.1 percent are advantageous.

It is contemplated that the amount of natural uranium used in the chain reacting system described below may be decreased, and consequently the size of the system decreased, by enriching the natural uranium with $Pu^{239}$.

It is also within the bounds of this invention to mix the $Pu^{239}$ with other chain reactive isotopes such as isotopes which undergo fission with thermal neutrons, of which $U^{235}$ and $U^{233}$ are examples.

Referring to Fig. 1, in which the mass of $Pu^{239}$ is plotted against the concentration in water, a similar graph can be made for $U^{235}$ and $U^{233}$ by simply multiplying the mass of $Pu^{239}$ by 1.3 and the concentration or density by 1.3. The critical mass of $U^{235}$ or $U^{233}$ for various concentrations may then be determined from the graph and by interpolation the critical masses for mixtures of $U^{235}$, $U^{233}$ and $Pu^{239}$ can be determined. Substantially the same relationship for $U^{235}$ and $Pu^{239}$ holds for the graphs in Figs. 2 and 3.

Mixtures of $Pu^{239}$ with thorium which contain in the range of about 0.7 to 2 percent $Pu^{239}$ or higher are also capable of undergoing a self-sustaining nuclear chain reaction. Such a reactor may comprise aggregates of metallic thorium containing $Pu^{239}$ and dispersed in a neutron moderator such as carbon. Moreover, intimate mixtures of $Pu^{239}$, thorium and heavy water may be used. Such a self-sustaining controllable nuclear chain reaction is contemplated as a useful method of preparing $U^{233}$.

It is also desirable to avoid so far as possible the presence in the starting material of radioactive elements such as result from the fission of uranium by neutrons. As the chain reaction of neutrons with $Pu^{239}$ continues, similar fission elements build up. But at least at the start of the reaction it is preferred to use compositions substantially free from fission products since the presence of such elements makes the composition difficult to work with, and in fact in high concentrations tends to poison the mass so that the reaction may stop unless the composition which is subjected to neutron bombardment is increased in mass or increased in concentration of $Pu^{239}$, or relieved of fission products.

Figure 2:
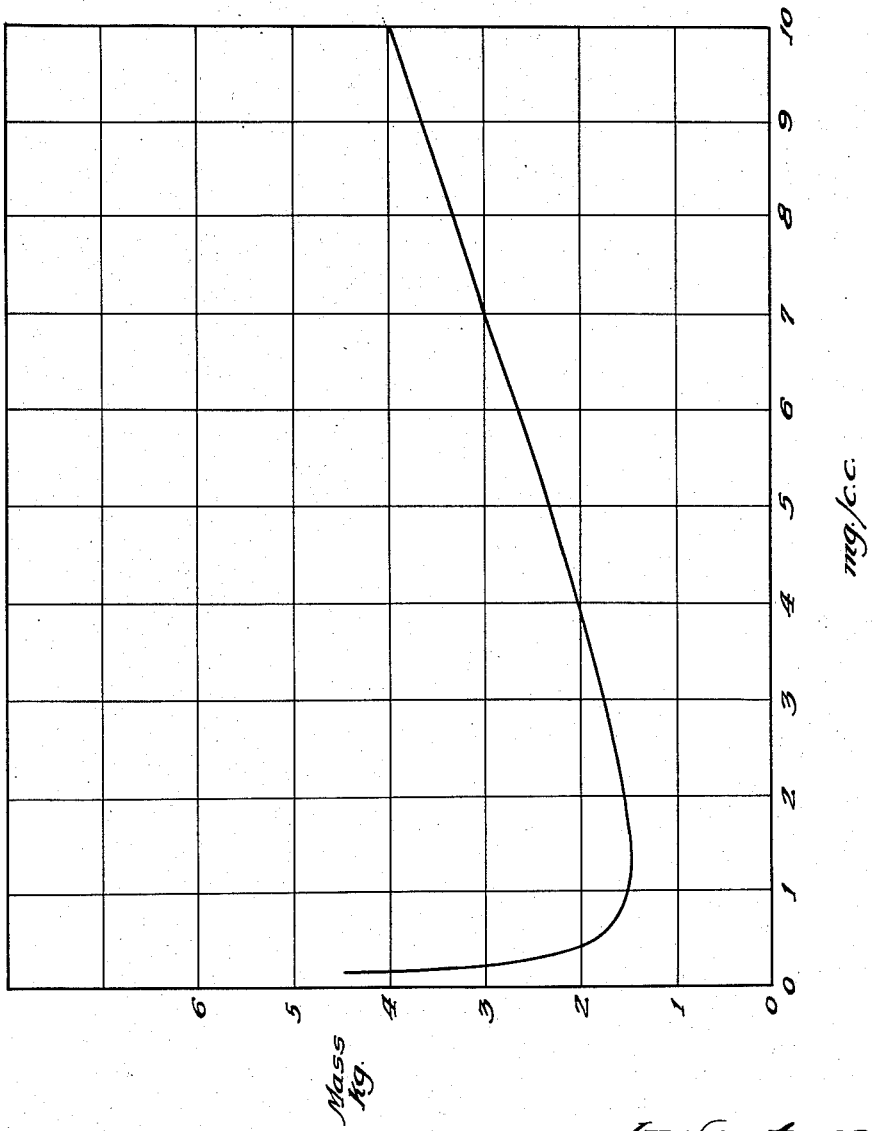
Fig. 2 is a similar graph illustrating critical mass when heavy water ($D_2O$) is used as a moderator in lieu of water.
Figure 3:
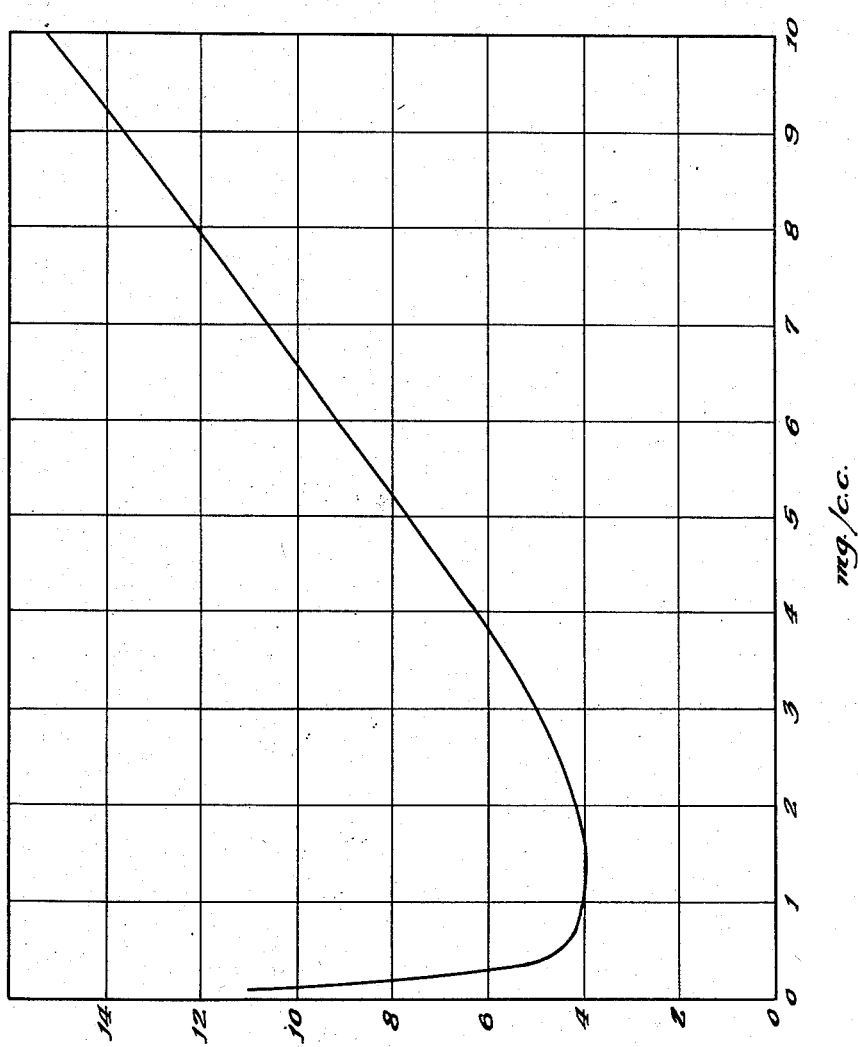
Fig. 3 is a similar graph showing critical mass when carbon is used as a moderator.

In the graphs shown in Figs. 1, 2, and 3 the conditions are for no reflector. Ordinarily a reflector is used in order to decrease the critical amount of $Pu^{239}$ required to obtain a self-sustaining chain reaction.

The amount of fissionable isotope such as $Pu^{239}$ which should be present in order to establish a self-sustaining neutron chain reaction depends also to a substantial degree upon the concentration of the fissionable isotope and also upon the neutron absorption characteristics of the moderator used. In general it can be said that the amount of $Pu^{239}$ present should be at least 200 grams with optimum concentration and using either pure $Pu^{239}$ or uranium concentrates containing about 5% or more of $Pu^{239}$. When $U^{235}$ is used to replace a portion of the $Pu^{239}$ slightly more total fissionable isotope is required as indicated above.

The following table tabulates the critical mass which is required for various concentrations of a uranyl-plutonyl sulphate solution in $D_2O$ using an infinite $D_2O$ reflector. The proportion of plutonium is 12.5 percent based upon the total weight of uranium and plutonium. In the table Z denotes the number of atoms of $Pu^{239}$ present per molecule of $D_2O$, and G denotes the critical quantity of $Pu^{239}$ required. $V_X$ is the critical volume in liters.

| | | | | | | | |
|---|---|---|---|---|---|---|---|
| $Z \times 10^{-3}$ | 0.1 | 0.2 | 0.25 | 0.3 | 0.5 | 1.0 | 2.0 |
| $V_X$, Liter | 180 | 80 | 62 | 51 | 32 | 18 | 11 |
| G, gm | 290 | 210 | 205 | 205 | 210 | 240 | 290 |

From the above table it is shown that a minimum critical mass as low as about 200 grams of $94^{239}$ is capable of sustaining a reaction in a $D_2O$ moderator with an infinite $D_2O$ reflector. Not less than about 300 grams of $U^{235}$ would be required were $U^{235}$ to be substituted for the $94^{239}$ in the above solution.

The variation in critical mass which is required to sustain a neutron chain reaction depends to a very substantial degree upon the nature and thickness of the neutron reflector.

It has been found that $H_2O$ is a somewhat poorer reflector than graphite, $D_2O$, beryllium, or beryllium oxide. The actual density of the neutron reflector has some bearing upon the reflecting character of the material as shown by the fact that a substantially smaller critical mass is required where beryllium oxide is compacted to a density of 3 than where this oxide has a density of 2.

It will be apparent that no hard and fast figure for critical mass may be given since the mass will vary with the nature of the moderator, nature of the fissionable isotope, concentration in moderator, nature and depth of reflector as well as concentration of impurities including $U^{238}$ or $Th^{232}$. Generally speaking, however, not less than about 200 grams of the fissionable isotope is required using the best of moderators and securing maximum neutron reflection at optimum concentration. Where ordinary water is used not less than about 300 grams of fissionable isotope will be required and where the fissionable isotope is $U^{235}$ the minimum concentration for the best available moderator will be at least about 300 grams and for water it will be at least about 500 grams. These amounts must be increased with increasing proportion of impurities including coolant or other neutron absorbing agent and also with variation in the concentration and neutron reflection of the system. Moreover the actual amount used in a reactor is somewhat higher since the reactor generally is desired to be larger than critical size.

The reactors herein contemplated are operative when using pure fissionable isotopes such as pure $Pu^{239}$, pure $U^{235}$, etc. However such purity is not necessary and frequently it is desirable to conduct the reaction in the presence of an isotope capable of absorbing neutrons to yield a further quantity of fissionable isotope as the reaction proceeds. Thus uranium containing $U^{238}$ in concentrations, for example, about 5 to 99 percent, the balance being $U^{235}$, offers certain advantages since $U^{238}$ is converted to $94^{239}$ which aids $U^{235}$ to support the reaction. The same is true when $Th^{232}$ is used in lieu of $U^{238}$, as $U^{233}$ is formed during the reaction.

From the above description it can be seen that fissionable isotopes when used in densities in a moderator, higher than densities obtainable naturally can be used to create a self-sustaining chain reaction in a very small reactor, with amounts only on the order of a kilogram of the fissionable isotope.

A simple device for the production of energy and fission products from $Pu^{239}$ by a nuclear chain reaction may consist simply of a chain reacting mass of $Pu^{239}$ and some means for transferring the heat produced by the chain reaction to a point outside the system for utilization. Thus, for example, a fluid medium such as water can be conducted to a place where the heat energy imparted to it from the chain reacting mass can be utilized. In this manner sufficient heat can be transmitted to convert a fluid, such as water, to high pressure steam which can be used to run a steam engine or turbine, which in turn can be employed to drive a generator for production of electric energy. Other methods of converting the surplus energy developed during fissioning to useful energy outside the system will be apparent to those skilled in the art.

In any of the chain reacting devices the loss of neutrons outside of the reaction mass may be decreased by reflecting escaping neutrons back into the system. This may be done by surrounding the body containing the $Pu^{239}$ with, for example, a material having more nuclei per cc. than about $1 \times 10^{22}$ and a greater scattering cross section than about $1 \times 10^{-24}$ square centimeters.

Suitable neutron reflecting materials are water and heavy water. One highly suitable material for neutron reflecting may be uranium, preferably uranium predominating in $U^{238}$, such as natural uranium, since uranium will not only reflect neutrons back into the system but also a certain number of additional neutrons will be produced by the uranium. Other suitable neutron reflecting materials include substances having relatively high mass numbers, such as tungsten and lead.

It will be understood that in addition to producing energy from the chain reaction of $Pu^{239}$, fission products, some of which are radioactive, are also produced. These substances may be extracted from the remaining $Pu^{239}$ and used for any desired purpose, such as tracer substances in chemical and biological studies.

One device which has particular advantages in producing energy and fission products from chain reactive compositions which are or become liquid and vaporize at elevated temperatures, consists of a pressure-tight chamber containing a body of the said chain reactive composition. Such a pressure-tight device may also have a surrounding water jacket serving as a steam boiler.

The following descriptions of systems, in which the amounts and concentrations of $Pu^{239}$ are expressed in terms of elemental $Pu^{239}$, are given solely to illustrate the invention and are not to be considered as limiting the invention to the details described therein.

Figure 4:
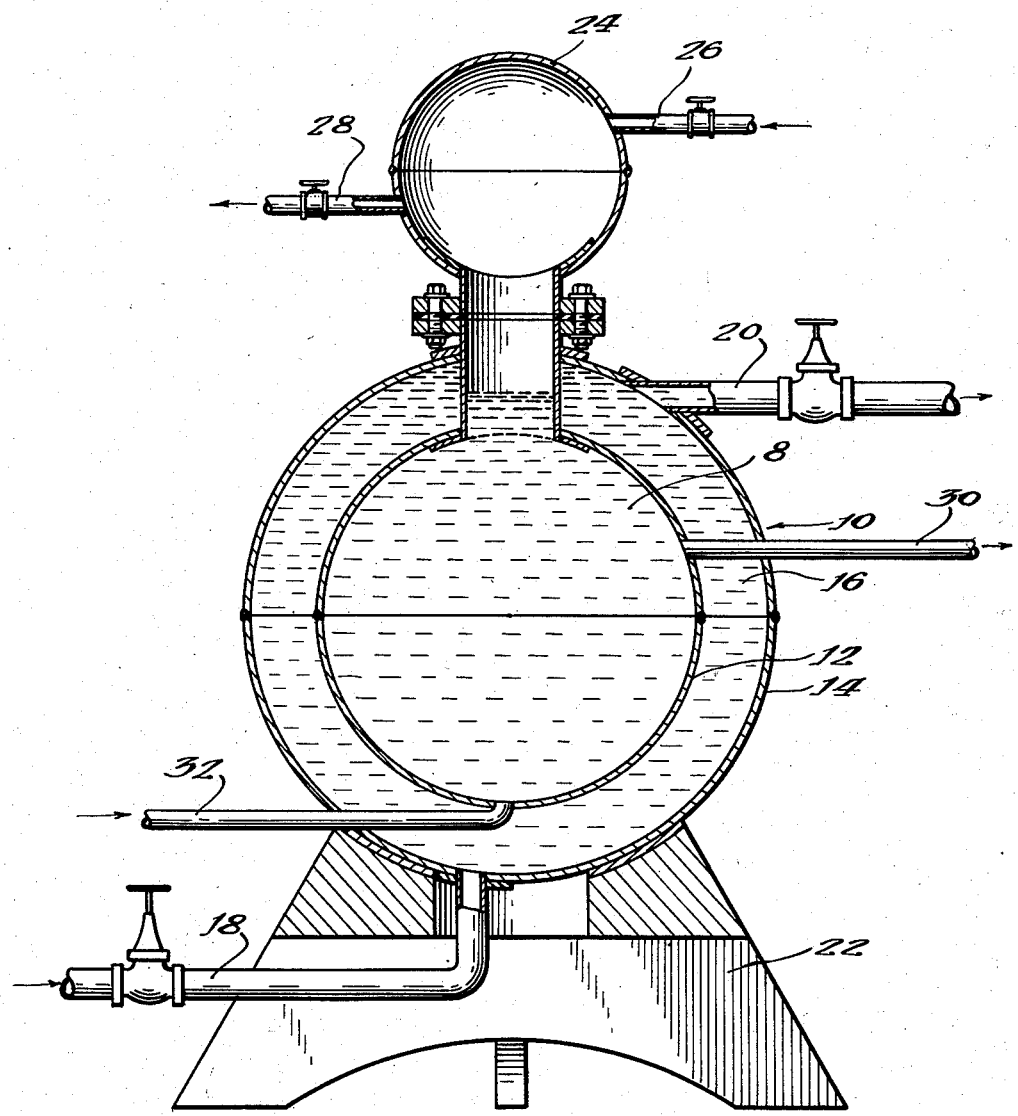
Fig. 4 is a diagrammatic cross sectional view, partly in elevation, taken on a vertical plane through the center of a reactor embodying the principles of the present invention.

System for $Pu^{239} + H_2O$ 1000 grams of $Pu^{239}$ in the form of $Pu^{239}$ sulphate are dissolved in 40,000 grams of water. The solution 8 is poured into a spherical pressure container 10, such as is shown in Fig. 4. The container 10 may have a jacket formed by walls 12 and 14 of steel of 0.2 centimeter thickness spaced 20 centimeters apart in one embodiment and through which water 16 is circulated by means of inlet pipe 18 and outlet pipe 20, both valves controlled so that a wall of water of 20 centimeters thickness surrounds the solution. A base 22 supports the container 10 and associated parts. The nuclear self-sustaining chain reaction starts in the solution 8 by itself and continues until the mass is decreased below the critical amount of $Pu^{239}$ or until it becomes poisoned from the production of fission products. Heat is evolved during the reaction and this heat is conducted to the water 16 in the jacket, converting the water into steam which may be used to run an engine or turbine (not shown). The solution 8 in the container 10 is kept under pressure supplied to a pressure cap 24 through a valved line 26 so that it remains liquid at the high temperature of the reaction. Pressure may be exhausted through valved line 28. Inlet line 30 and outlet line 32 are provided for adding and withdrawing solution 8 to and from the container 10, respectively.

Neutron absorbing material may be used to control the power level of the device. For example, rods of neutron absorbing material (not shown), such as cadmium or boron-steel, may be pushed out of or into the interior of the composition to serve as a control. Thus, if the rate of neutron production is too low to maintain a chain reaction or to maintain the temperature at the desired value control rods may be removed until the proper rate of production has been achieved after which they may be reinserted far enough to cause the rate of production of neutrons to remain constant or if desired to decrease.

The above example gives suitable operating conditions. The minimum concentration of $Pu^{239}$ which will undergo a chain reaction with slow neutrons (using a dispersion of $Pu^{239}$ in a moderator in a spherical container) is about .2 milligram per cubic centimeter. For ordinary water the minimum concentration is about 10 mg. per cc. The maximum concentration which is controllable as a slow neutron chain is about 10 gm. per cc. With larger concentrations the rate of production of neutrons increases so rapidly that it is difficult or impossible to stop the reaction or hold it to a constant rate.

The minimum amount of $Pu^{239}$ in a water dispersion for thermal neutron chain reaction is about 300 gms. with a reflector and about 1500 gms. with no reflector. The water jacket of the above described device acts as a neutron reflecting casing.

System for $Pu^{239} + paraffin$

The values for critical masses and concentrations for this system are practically the same as for the $Pu^{239}$—water system (see Figure 1). The $Pu^{239}$ may be in the form of discrete particles of metallic $Pu^{239}$ of less than .2 mm. diameter dispersed in the paraffin.

System for $Pu^{239} + heavy\ water$

The minimum suitable concentration of $Pu^{239}$ is about .2 mg. per cc. of heavy water, the maximum concentration for effective control being about 1 gm. per cc. The minimum critical amount of $Pu^{239}$ is about 200 gms.

System for $Pu^{239} + carbon$

The minimum suitable concentration of $Pu^{239}$ uniformly dispersed in a carbon mass is about .2 mg. per cc. of carbon and the maximum concentration for effective control is about 1 gm. per cc. The minimum critical amount of $Pu^{239}$ is about 1 kg. Carbon of density about 2 gm. per cc. is referred to. In using a solid neutron slowing medium it is usually found necessary to cool the assembly internally to prevent overheating and consequent injury to the product. Consequently cooling tubes are located in the carbon and cooling fluid such as helium, water, diphenyl, mercury, vapor, etc. circulated therethrough. By permitting the assemblage to operate at a sufficiently high temperature the heat removed from the cooling water may be abstracted and used to generate power.

The above descriptions show suitable amounts and concentrations of $Pu^{239}$ in various dispersing media for attaining a chain reaction. When metallic $Pu^{239}$ is employed, it is preferably intimately dispersed in particles of less than about 0.2 mm. diameter throughout the dispersion medium. Approximately the same relations shown for the dispersions of metallic $Pu^{239}$ will also hold for dispersions or solutions containing compounds of $Pu^{239}$ with other elements, where the absorption cross sections of such other elements are less than about $10^{-24}$ square centimeters. Thus, the relations will hold for dispersions in heavy water, water or carbon of such materials as the sulphates, carbonates and oxides of $Pu^{239}$.

Methods of separating $Pu^{239}$ from foreign products present in neutron irradiated uranium compounds of $Pu^{239}$, and aqueous solution of $Pu^{239}$ compounds are described in detail in the copending application of Wahl and Kennedy Serial No. 637,486, filed December 27, 1945 and are hereby incorporated in this case by reference thereto.

Metallic $Pu^{239}$ may be made by heating $Pu^{239}\ F_3$ or $Pu^{239}\ F_4$ with a reducing metal such as sodium, calcium, or magnesium by the same methods used to produce cerium metal.

$Pu^{239}$ metal or compounds of $Pu^{239}$ may be shaped into the form of spheres, cylinders, blocks or the like by known methods of shaping uranium or cerium metal and compounds. Such shaped articles of manufacture may be used as a source of nuclear power, as disclosed in the present application. In this specification and in the claims thermal neutrons mean neutrons in energy equilibrium with their surroundings. The energy of such neutrons is stated as an average value. At room temperature thermal neutrons have average energies of about 0.03 electron volts. Slow neutrons are defined herein as neutrons having average energies of below 1000 electron volts. Resonance neutrons generally have energies between 0.3 to 1000 electron volts. Medium fast neutrons means neutrons having average energies between 1000 to 500,000 electron volts, fast neutrons from 500,000 to 5,000,000 and very fast neutrons greater than 5,000,000 electron volts. The term "thermal neutron fissionable isotope" means an isotope fissionable with thermal neutrons at room temperature.

While there have been described certain embodiments of the invention, it is to be understood that it is capable of many modifications. Changes, therefore, may be made without departing from the spirit and scope of the invention as described in the appended claims, in which it is the intention to claim all novelty in the invention as broadly as possible.

What is claimed is:

1. The method of producing energy and radioactive fission products which comprises subjecting material containing natural uranium to bombardment with neutrons, concentrating the neptunium formed thereby, holding the neptunium until it decays to plutonium, concentrating the plutonium to remove most of the uranium therefrom, dispersing the plutonium in a neutron slowing material selected from the group consisting of paraffin, water, and carbon, and subjecting said mass to the action of neutrons.

2. The method of producing energy and radioactive fission products which comprises distributing uranyl nitrate in a paraffin block, bombarding said uranyl nitrate with neutrons obtained from the beryllium target of a cyclotron, extracting the uranyl nitrate from the solution with diethyl ether, isolating neptunium from the aqueous phase, holding the neptunium until it decays to plutonium, concentrating the plutonium, dispersing the plutonium in paraffin and subjecting the resulting mass to the action of neutrons.

References Cited in the file of this patent

UNITED STATES PATENTS

| 2,206,634 | Fermi et al. | July 2, 1940 |
| 2,708,656 | Fermi et al. | May 17, 1955 |
| 2,811,415 | Seaborg | Oct. 29, 1957 |
| 2,855,269 | Boyd et al. | Oct. 7, 1958 |
| 2,856,261 | Stoughton | Oct. 14, 1958 |

FOREIGN PATENTS

| 861,390 | France | Oct. 28, 1940 |
| 233,011 | Switzerland | Oct. 2, 1944 |

OTHER REFERENCES

Physical Review, vol. 56 (August 1, 1939), pp. 284–286. An article by Anderson et al.

Physical Review 56 (1939), pages 426, 427, 428, 448.

Anderson et al.: "The Fission of Uranium," Physical Review, vol. 55, pp. 510–511, March 1939.

Foster: "Bombardment of Uranium With Fast and Slow Neutrons," Journal of Chemical Education, September 1940, pp. 448–9.

AECD–3063, Water Boiler, Los Alamos Scientific Lab., Sept. 4, 1944. Available from AEC Technical Information Service, Oak Ridge, Tenn. Pages 1–12, 17.

Smyth: "Atomic Energy for Military Purposes," August 1945. Copy may be purchased from Supt. of Documents, Washington 25, D.C.

Kennedy et al.: Phys. Rev. 69, 367–8 (1946).

Kennedy et al.: Phys. Rev. 70, 555–6 (1946).

Goodman: "The Science and Engineering of Nuclear Power," vol. 1, pages 275, 302, 305, Addison-Wesley (1947).

Nuclear Fission, by William E. Stephens. The Science Press, Lancaster, Pa. Page 127 (1948).

The Transuranium Elements, Part I, G. T. Seaborg et al., McGraw-Hill Book Co., N.Y. (1949). Paper 1.1a, pages 1, 2; Paper 1.3, pages 8, 9; Paper 1.6, pages 25–33; Paper 1.8, pages 51, 52.